United States Patent Office 2,759,270
Patented Aug. 21, 1956

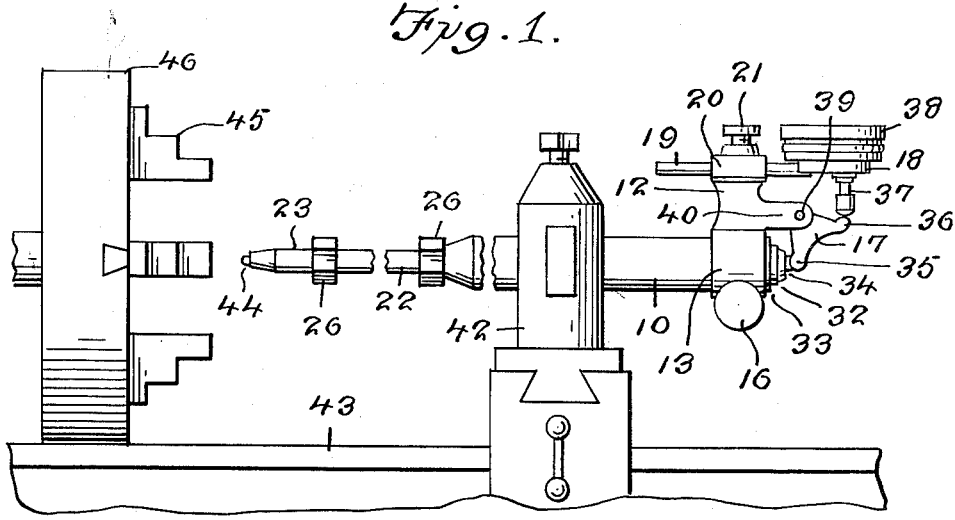

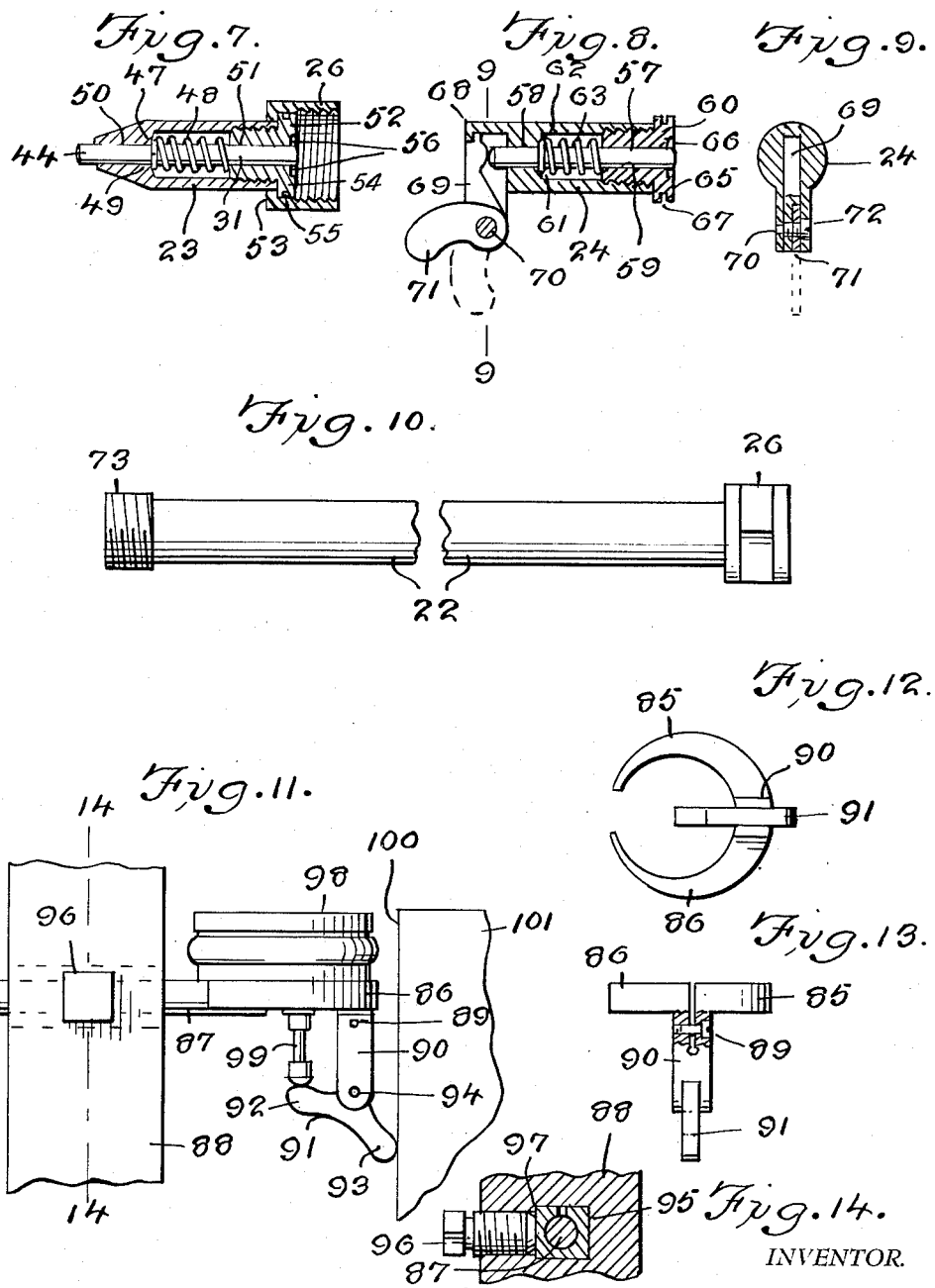

2,759,270

PLAIN SIGHT DIAL INDICATOR ATTACHMENTS

William Edward Fine, Somers, Mont.

Application September 21, 1954, Serial No. 457,470

4 Claims. (Cl. 33—172)

This invention relates to attachments for use with dial indicators to facilitate centering work on a machine, checking out-of-round parts and also run-out of machine parts, and in particular, a bell crank, quadrant, or right angularly disposed lever having an arm adapted to engage the end of a rod and also an arm adapted to engage the end of a stem of a dial indicator whereby work positioned to be engaged by the rod causes the arm to actuate the indicator with the dial of the indicator in a horizontal position or in plain sight of an operator.

The purpose of this invention is to provide an attachment particularly adapted to be used on a lathe, or milling or boring macrine wherein measurements taken in a horizontal plane are converted to vertical planes to facilitate actuating a dial so that discrepancies in parts of work positioned on a machine are registered in such a position that they may readily be observed by an operator.

With conventional dial indicators or gauges having micrometer adjustments, it is sometimes difficult to hold the indicator in such positions that it is possible to read the dial. With this thought in mind, this inventon contemplates attachments adapted to be used wth dial indicators wherein the direction of movement of a measuring rod or device is converted from horizontal to vertical so that it is possible to hold the indicator in a horizontal position wherein the position of a needle thereof is readily ascertained.

The object of this invention is, therefore, to provide means for forming attachments for measuring devices whereby a rod or extensions or attachments thereto, positioned to engage surfaces of work held in a chuck or the like, contacts an arm of a lever pivotally mounted in the attachment whereby an arm positioned at a right angle to the former arm moves in a vertical plane to actuate a stem of a dial indicator positioned on the attachment.

Another object of the invention is to provide an attachment for converting horizontal motion into vertical motion to facilitate taking readings with a dial indicator in which the device is adapted to be used on a lathe, boring machine, or the like without changing the lathe or machine.

A further object of the invention is to provide an attachment for taking measurements to facilitate centering work in a machine, checking out-of-round parts of work and also checking run-out of machine parts to facilitate taking readings with a dial indicator, in which the device is of a simple and economical construction.

With these and other objects and advantages in view, the invention embodies a barrel having a threaded nipple of reduced diameter on one end and in which the opposite end is plain, extensions and adapters adapted to be threaded on the nipple and lever and dial-retaining elements adapted to be clamped on the plain end of the barrel.

Other features and advantages of the invention will appear from the following description, taken in connection with the drawings, wherein:

Figure 1 is a front elevational view looking toward the front side of the intermediate part of a lathe, illustrating the use of the indicator dial attachment with the barrel thereof secured in the tool post of the lathe and with extensions on the end of the barrel positioned to engage work on a chuck to facilitate centering and positioning the work.

Figure 2 is an end elevational view of the attachment positioned on the end of the barrel shown in Figure 1 with the dial indicator omitted and with the parts shown on an enlarged scale.

Figure 3 is a longitudinal section through the end of the barrel on which the threaded nipple is positioned showing a rod in the barrel and also showing the parts on an enlarged scale.

Figure 4 is a longitudinal section also taken through the end of the barrel on which the threaded nipple is positioned illustrating a method of connecting an adapter to the barrel.

Figure 5 is a plan view of an adapter showing the device clamped on the end of the barrel and illustrating an adapter for actuating a dial indicator having a horizontally disposed contact point.

Figure 6 is an end elevational view of the adapter shown in Figure 5 with the dial indicator omitted.

Figure 7 is a longitudinal section through an adapter having a contact rod extended longitudinally therethrough.

Figure 8 is a longitudinal section through an adapter, similar to that shown in Figure 7, illustrating a lever pivotally mounted in connection with the rod and in which the lever is provided with an arcuate arm adapted to engage work and the like positioned in a machine.

Figure 9 is a cross section through the adapter shown in Figure 8 being taken on line 9—9 thereof.

Figure 10 is a side elevational view of an extension element adapted to be used in combination with the barrel.

Figure 11 is a view illustrating the use of the attachment in a cylinder or the like in which the attachment is carried by a boring bar and a contact element thereof is positioned to engage the inner surface of a wall of the cylinder.

Figure 12 is a plan view of the attachment shown in Figure 11 illustrating the arms for retaining the attachment on a bar or the like.

Figure 13 is an end elevational view of the attachment shown in Figure 11 with parts broken away showing the pivotal mounting of the lever in the lower end and the clamp for retaining the arcuate arms on a rod.

Figure 14 is a cross section taken on line 14—14 of Figure 11 showing a set screw for clamping a bar on which the attachment is positioned in the rod of a boring tool.

Referring now to the drawings, wherein like reference characters denote corresponding parts, the improved dial indicator attachment of this invention includes a barrel 10, a rod 11 extended through the barrel, a bracket 12 secured to the barrel with a clamp 13 including flanges 14 and 15 and a thumb screw 16, a bell crank or lever 17 pivotally mounted in the bracket, a loop 18 having a rod 19 extended from one side and positioned with the rod secured in a socket 20 in the upper end of the bracket with a thumb screw 21, extensions 22 for extending the length of the barrel and adapters 23 and 24 which, with the extensions 22, are adapted to be secured on a threaded nipple 25 on the extended end of the barrel 10 with coupling elements 26.

The barrel 10 is provided with a bore 27 which extends inwardly from the plain end to a shoulder 28 and a ring 29, on the rod 11 is positioned to engage the shoulder to limit movement of the rod toward the end of the barrel on which the threaded nipple 25 is positioned. The end of the barrel is provided with a recess 30 which facilitates engagement of the end of the rod 11 with a rod, such as a rod 31, in the adapter 23, shown in Figure 7. The opposite end of the rod 11, which is indicated by the numeral 32, extends through a bushing 33 or the like in the end of the barrel 10 and a tip 34 of the rod is positioned to engage an arm 35 of the bell crank or lever 17, an opposite arm 36 of which is positioned to engage the end of a stem 37 of a dial indicator 38 positioned on the loop 18. The lever 17 is pivotally mounted by a pin 39 between ears 40 and 41 which extend from the bracket 12, and with the lever pivotally mounted in this manner, longitudinal movement of the rod 11 is transmitted directly to the stem 37 of the dial indicator 38.

The barrel 10 is clamped in a tool post, such as post 42, shown in Figure 1, on a lathe bed 43, or the like and a tip 44 of an adapter, such as the adapter shown in Figure 7, is adapted to engage the surface or surfaces of a piece of work positioned on jaws 45 of a chuck 46 whereby the distances of surfaces of the piece of work from a vertical plane may be accurately determined. By engaging the parts of the work with the tip 44, it may also be determined whether or not the piece of work is out-of-round or on the exact center.

The rod 31 of the adapter 23 shown in Figure 7 is provided with a collar 47 that is retained by a spring 48 against a shoulder 49 whereby the rod is retained in position, as shown in Figure 7. One end of the rod is slidably mounted in a bore 50 in the tip of the adapter and the opposite end in a bore 51 of a bushing 52 that is adapted to be clamped by a flange 53 of the coupling 26 against the end of the threaded nipple 25 of the barrel 10, as shown in Figure 4. The bushing 52 is threaded in the end of the adapter 23 and an annular flange 54 is provided with openings 55 for a spanner wrench or the like. The end of the bushing 52 is also provided with a recess 56 that is positioned to register with the recess 30 in the end of the barrel 10.

In the adapter illustrated in Figure 8, a rod 57, similar to the rod 31, is mounted in a bore 58 at one end and also in a bore 59 in a bushing 60 at the opposite end and a collar 61 on the rod is urged against a shoulder 62 with a spring 63. The bushing 60 is threaded in the end of the casing 24 of the adapter and the end of the bushing is provided with an annular flange 65 that is also provided with an annular recess 66 and openings 67 for a spanner wrench or the like.

A head 68 on the outer end of the adapter 24 is provided with an arm 69 that is positioned to be engaged by the end of the rod 57 and, with the parts positioned as shown in Figure 8, the arm 69, which is pivotally mounted by a pin 70, is adapted to move an arm 71 in the lower part of the head 68. The position of the rod 71 is adapted to be adjusted by a screw 72, the intermediate portion of which forms the pin 70 upon which the arms 69 and 71 are positioned. By this means, the arm 71 is adapted to be set to contact a cylinder wall or surface of work positioned in a lathe, boring tool, or the like.

The adapters illustrated in Figures 7 and 8 are, therefore, adapted to be secured by the couplings 26 to the threaded nipple on the end of the barrel 10 or to a similar threaded nipple 73 on one of the extensions 22, and it will be understood that as many extensions as may be desired may be used and the extensions may be of any suitable length.

In the design illustrated in Figures 5 and 6, an adapter is illustrated in which a clamp 74 is adapted to be secured on the end of a barrel 10 with a thumb screw 75 and a small clamp 76 having a thumb screw 77 therein and extended by arms 78 and 79 from the clamp 74 is adapted to slidably hold a stem 80 which extends through a bushing 81 whereby movement of the rod 11 in the barrel 10 engages a tip 82 on the end of the rod 80 to move a needle 83 of a dial indicator 84. By this means, a dial indicator of the type having a horizontally disposed stem is adapted to be directly mounted on the end of the barrel 10.

In the design illustrated in Figures 11, 12, 13, and 14, fingers 85 and 86, which are adapted to hold a dial indicator body are shown as being carried by a rod 87 extended through a boring bar 88, and the fingers are secured in clamping relation with the body of the indicator by a screw 89 that extends through the slit upper end of a post 90. In the bifurcated lower end of the post a lever 91 having arms 92 and 93 extended therefrom is pivotally mounted with a pin 94. The rod 87 is positioned in an opening 95 extended through the boring bar 88 and, as illustrated in Figure 14, the rod 87 is secured in position with a set screw 96.

With the parts mounted in this manner, a stem 99, positioned to engage the arm 92 of the lever 91 of the adapter is adapted to be actuated, upon rotation of the boring bar 88, whereby with the end 93 of the lever in engagement with an inner surface 100 of a cylinder in a block 101 the indicator will readily show whether or not the cylinder is out-of-round.

It will be understood, therefore, that the adapter of this invention may be provided in different forms and the different forms may be clamped to or secured by the couplings 26 on the barrel 10 whereby with the barrel retained in a tool-holding post or boring bar an operator may readily determine whether or not a piece of work in a machine is centered, or out-of-round, or positioned in a vertical plane. The parts may readily be assembled to compensate for work pieces of different patterns and designs.

It will be understood that modifications, within the scope of the appended claims, may be made in the design and arrangement of the parts without departing from the spirit of the invention.

What is claimed is:

1. A plain sight attachment for dial indicators comprising a tubular body providing a barrel, said tubular body being plain at one end and having a threaded nipple on the opposite end, a rod extended through the barrel and freely slidable therein, a bracket adapted to be clamped on the plain end of the barrel, a lever having right angularly positioned arms pivotally mounted in the bracket, a socket positioned on the upper end of the bracket, a loop having a rod extended from one side thereof and positioned with the rod in the socket on the upper end of the bracket, said loop being adapted to suspend a dial indicator from the bracket with a stem of the indicator resting upon an arm of the lever and with the opposite arm of the lever in engagement with an end of the rod extended through the barrel, an adapter having a coupling on one end and said coupling being adapted to be threaded on the threaded nipple on the end of the barrel, and a rod in said adapted positioned with one end in engagement with the end of the rod extended through the barrel and with the opposite end of the rod projecting from the end of the adapter.

2. In a dial indicator attachment, the combination which comprises a tubular element providing a barrel, one end of said barrel being plain and the opposite end having a threaded nipple thereon, a rod extended through the barrel and longitudinally slidable therein, an adapter positioned against the end of the threaded nipple of the barrel, a coupling positioned on the adapter and threaded on said threaded nipple for securing the adapter to the barrel, a rod longitudinally slidable in the adapter positioned with one end in engagement with the end of the rod of the barrel and with the other extended from the extended end of the adapter, resilient means for retaining the rod in the adapter, a bracket clamped on the plain end of the barrel, a lever having angularly disposed arms pivotally mounted in the bracket, and a socket positioned on the upper end of the bracket, a loop having a rod extended from one side thereof and positioned with the rod in the socket on the upper end of the bracket, said loop being adapted to suspend a dial indicator from the bracket with a stem of the indicator in engagement with an arm of the lever, the opposite arm of which is in engagement with the end of the rod extended through the barrel.

3. In a dial indicator attachment, the combination which comprises a tubular element providing a barrel, one end of said barrel being plain and the opposite end having a threaded nipple thereon, a rod extended through the barrel and longitudinally slidable therein, an extension having a threaded nipple on an extended end, a coupling positioned on the end of the extension opposite to the end on which the threaded nipple is positioned and threaded on the threaded nipple on the end of the barrel, an adapter positioned against the extended end of the extension, a coupling positioned on the adapter and threaded on said threaded nipple of the extension for securing the adapter to the extension, a rod longitudinally slidable in the adapter positioned with one end in engagement with the end of the rod of the barrel and with the other extended from the extended end of the adapter, resilient means for retaining the rod in the adapter, a bracket clamped on the plain end of the barrel, a lever having angularly disposed arms pivotally mounted in the bracket, a socket positioned on the upper end of the bracket, a loop having a rod extended from one side thereof and positioned with the rod in the socket on the upper end of the bracket, said loop being adapted to suspend a dial indicator from the bracket with a stem of the indicator in engagement with an arm of the lever, the opposite arm of which is in engagement with the end of the rod extended through the barrel.

4. In a dial indicator attachment, the combination which comprises a tubular element providing a barrel, one end of said barrel being plain and the opposite end having a threaded nipple thereon, a rod extended through the barrel and longitudinally slidable therein, an adapter positioned against the end of the threaded nipple of the barrel, a coupling positioned on the adapter and threaded on said threaded nipple for securing the adapter to the barrel, a rod longitudinally slidable in the adapter positioned with one end in engagement with the end of the rod of the barrel and with the other extended from the extended end of the adapter, resilient means for retaining the rod in the adapter with the end extended therefrom, a bracket clamped on the plain end of the barrel, a lever having angularly disposed arms pivotally mounted in the bracket, a socket positioned on the upper end of the bracket, a loop having a rod extended from one side thereof and positioned with the rod in the socket on the upper end of the bracket, said loop being adapted to suspend a dial indicator from the bracket with a stem of the indicator in engagement with an arm of the lever, the opposite arm of which is in engagement with the end of the rod extended through the barrel, and a lever having angularly disposed arms pivotally mounted on the end of the adapter.

References Cited in the file of this patent

UNITED STATES PATENTS

| | | |
|---|---|---|
| 1,257,483 | Hart et al. | Feb. 26, 1918 |
| 1,359,943 | Wilhelm | Nov. 23, 1920 |
| 1,361,848 | Green | Dec. 14, 1920 |
| 1,792,043 | Scusa | Feb. 10, 1931 |
| 2,383,272 | Page | Aug. 21, 1945 |
| 2,581,473 | Eisele | Jan. 8, 1952 |

FOREIGN PATENTS

| | | |
|---|---|---|
| 644,333 | Germany | Apr. 29, 1937 |
| 541,129 | Great Britain | Nov. 13, 1941 |